United States Patent [19]
Pettit

[11] 3,733,059

[45] May 15, 1973

[54] PLASTIC EXTRUDER TEMPERATURE CONTROL SYSTEM

[75] Inventor: Glenn A. Pettit, Bloomington, Minn.

[73] Assignee: Rosemount Inc., Eden Prairie, Minn.

[22] Filed: Aug. 10, 1971

[21] Appl. No.: 170,585

[52] U.S. Cl............259/191, 259/DIG. 18, 425/143
[51] Int. Cl. ................................................B29b 1/10
[58] Field of Search............................425/143, 144; 100/93 S; 259/DIG. 18, 9, 10, 191, 192, 193, 156, 157; 99/234 R, 237 R, 238 R, 238 PD

[56] References Cited

UNITED STATES PATENTS

| | | | |
|---|---|---|---|
| 3,354,501 | 11/1967 | Bachman et al | 425/144 |
| 3,070,836 | 1/1963 | De Haven et al. | 425/143 X |
| 3,339,228 | 9/1967 | Seanor et al. | 425/143 X |
| 3,346,912 | 10/1967 | Fewel et al. | 425/143 X |
| 3,587,137 | 6/1971 | Baldridge | 425/144 |

Primary Examiner—Robert W. Jenkins
Assistant Examiner—Philip R. Coe
Attorney—Ralph L. Dugger et al.

[57] ABSTRACT

A temperature control system for controlling plastic extruders wherein a tachometer generator signal dependent upon motor speed is utilized to compensate for temperature changes in an extruder caused by changes in the speed of the extruder screw.

7 Claims, 1 Drawing Figure

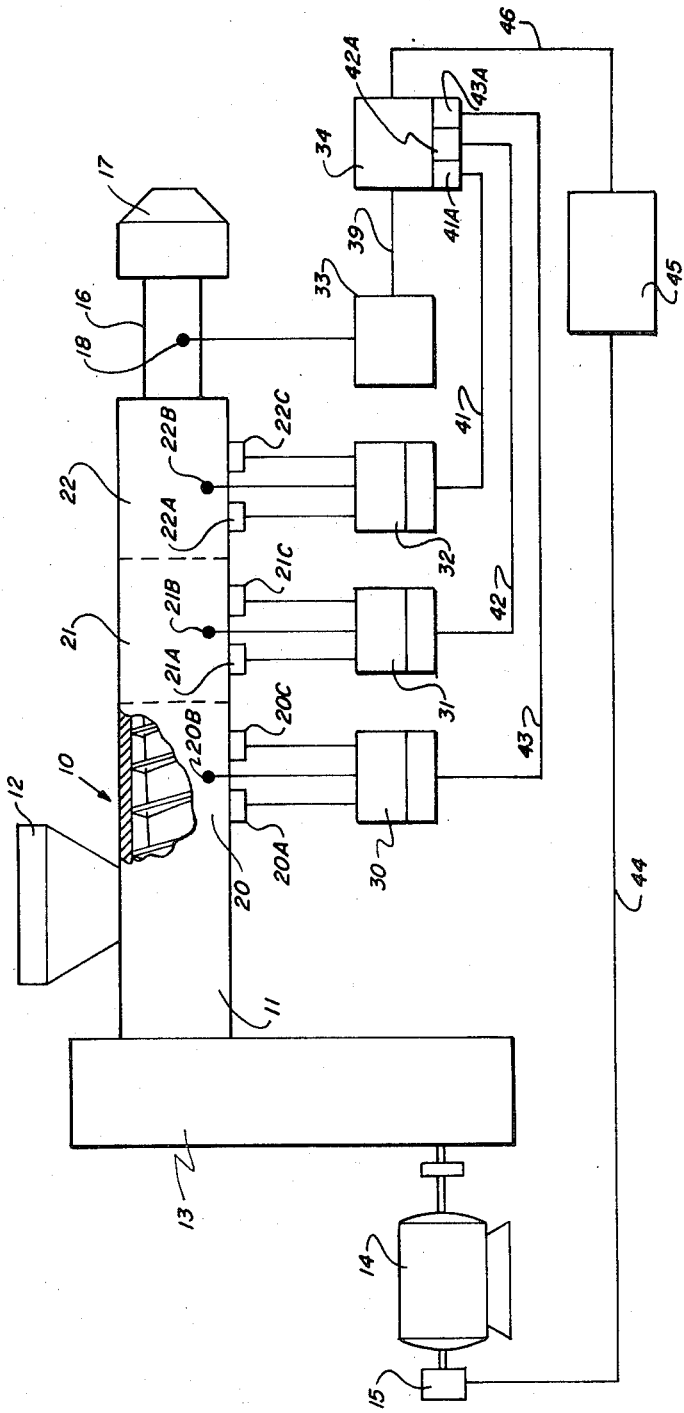

PLASTIC EXTRUDER TEMPERATURE CONTROL SYSTEM

BACKGROUND OF THE INVENTION

1. Field of the Invention

The present invention relates to extruders, and control means for controlling the temperature thereof.

2. Prior Art

Some prior art extruders use a screw inside a barrel and have a control system wherein temperatures in different sections of an extruder barrel are controlled in respect to set points, and the set points in turn are controlled in respect to the melt temperature which is the temperature of the material as it enters the extruder die. However, because of the long time constant from the time a temperature change in the barrel takes place, for example because of a change in screw speed, until this temperature change is sensed adjacent the die, the material issuing from the die can be of different characteristics than that desired because of the change in temperature.

SUMMARY OF THE INVENTION

The present invention relates to a feed forward control for extruders and the like. A signal proportional to changes in speed of an extruder screw or work element is used to compensate for resulting temperature changes in the material in the extruder. The device of the invention utilizes a tachometer generator on the drive motor for an extruder screw, to give a voltage output signal, and provides a circuit in the preferred embodiment, to give a voltage output proportional to the square of the drive motor speed, and this squared voltage signal is used as a modifying signal in existing controls to regulate the extruder temperature. This system gives accurate and prompt compensation in the extruder barrel, so that the temperature of the material at the die is accurately maintained.

Conventional electrical controls are utilized, except that a tachometer generator electrical signal which varies as a function of the screw speed is used in combination with existing control signals.

DESCRIPTION OF THE DRAWING

The single drawing enclosed is a schematic representation of an extruder mechanism and a control system utilizing the improvements of the present invention.

DESCRIPTION OF THE PREFERRED EMBODIMENT

Referring to the drawing, a screw type extruder is illustrated generally at 10. The extruder has a barrel 11 which encloses a helical screw which extends substantially along the entire length of the barrel 11, and on the inside thereof. The interior of the barrel and the screw are shown schematically. A feed hopper 12 is mounted at one end of the barrel 11, and is used in a conventional manner to feed plastic material, typically generally in solid pellet form into the barrel. Such plastic materials are thermoplastic resins. Other plastic materials which are processed similarly include thermosetting resins, food products, and other extrudable materials. A gear box 13 is used to drive the screw in the usual manner, and the input of the gear box 13 is driven by a motor 14. The motor 14 supplies the power to rotate the extruder screw and thus is the power source for the extrusion process. A die adapter section 16 is shown at the output end of the extruder barrel 11, and is open to the interior of the barrel. The adapter section 16 permits the connection between the barrel 11 and a forming die 17, which is used for forming the plastic (at this stage it is in a liquid or semimolten form) into the desired shape for the extrusion being made. For example, a sheet, strip or rod of formed material would issue from die 17. A sensor 18 senses the melt temperature, or in other words the material temperature in the adapter section before it enters the die 17.

The barrel 11 is temperature controlled in order to have the solid pellets turned into a molten or workable plastic material that is of sufficiently low viscosity to be extruded through the die 17. Generally, to accomplish this the barrel has a plurality of external heating sections, and each of these sections or heating zones is individually controlled as to temperature in order to obtain more accurate control of the temperature of the barrel and hence the material as it is extruded. For example, as shown, the barrel 11 has a first section 20, a second section 21, and a third section 22. These sections can be more in number, or fewer in number than those shown, and the showing herein is merely typical. In addition, the adapter section 16 and die 17 may also be temperature controlled, so that the end product coming out through the adapter 16 and die 17 is at the proper temperature.

In operation plastic pellets are placed into the hopper 12 and this feeds the pellets into the interior of the barrel 11. The screw is made to rotate by driving motor 14 and as the screw rotates, inasmuch as it is helical, if forces the plastic material toward the adapter section 16 and the die 17. The screw is normally made so that the root diameter of the helix increases in the direction toward the adapter section so that the semimolten plastic material is being continually worked as it is moved toward the adapter section. This makes mixing of the material very thorough, and uniformity exists through the molten plastic by the time it reaches the adapter section 16. The sensor 18 thus measures the final product melt temperature prior to the time the material enters the die 17.

Because of the action of the screw in working the plastic product, the screw speed affects the temperature of the plastic material and thus has quite an effect upon the heating or cooling requirements of the extruder barrel. Maximum output from an extruder is usually achieved at a high rpm with the plastic material then being worked rapidly with subsequent high heat generation. The quality of the product coming from the die 17 is known to be very dependent upon the temperature of the molten plastic.

The heating or cooling sections or zones 20, 21 and 22 of the barrel 11 are individually controlled by separate controller circuits 30, 31 and 32, respectively. The adapter section 16 and die 17 are also temperature controlled by conventional heaters not shown specifically in the drawing. Each of the barrel sections is made to include a heater device illustrated generally at 20A, 21A and 22A. The controllers are typically proportional type controllers wherein the controller set point is initially set at a desired temperature, and the controller activates heating or cooling apparatus until a temperature sensor in the barrel zone feeds back a signal equalling the set point. Temperature sensors 20B, 21B and 22B, provide a signal to controllers which indicate the temperature in the respective section or zone.

There are times when the barrel 11 will get above the desired temperature, and therefore the controllers 30, 31 and 32 may also control some means of cooling the barrel, and these are shown schematically as blocks at 20C, 21C, and 22C. Usually cooling is present only at the barrel zones adjacent the output end of the barrel. The cooling means are shown schematically and could be a cool water jacket around the barrel, or some means of circulating air around the barrel, such as a fan, to cool the exterior of the barrel, and therefore cool the plastic material in the barrel. The heating means illustrated at 20A, 21A, and 22A are normally electrical resistance type heaters mounted in a jacket wrapped around or attached to the outside of the extruder barrel 11, which is normally made of a metal and has high thermal conductivity.

The controllers 30, 31, and 32 are normally used in operation of a conventional extruder system. In the drawing a melt controller 33 responsive to the melt temperature, which is the temperature sensed by sensor 18 in adapter 16, is used to send out a suitable set point adjustment signal along line 39 to computer 34. Computer 34 combines this signal with a tachometer generator signal supplied along line 46 and provides output signals along lines 41, 42 and 43 to change the set points of these controllers 30, 31 and 32 to compensate for changes in the melt temperature at sensor 18. In the usual situation the set points of the controllers 30, 31 and 32 are depressed to compensate for an increase in melt temperature because of some change in operation which requires less heat, or more cooling in the zones or sections 20, 21 and 22 in order to get the desired temperature at sensor 18.

The material inside the extruder barrel of course is moving toward the adapter 16. The set points of the controllers 30, 31 and 32 are the set temperatures at which the particular zone being controlled is being held. The controllers 30, 31 and 32 will receive the temperature signal from the sensors 20B, 21B and 22B, and will compare these temperatures with the set point of the respective controllers, and will either add more heat by operating the heating portions 20A, 21A or 22A, or will supply cooling as required. The signal from sensor 18 is used in controller 33 and is passed to the computer 34 and is modified or conditioned in a manner which permits it to change the set points of controllers 30, 31 and 32 by sending the signals along lines 41, 42 and 43.

The extruder has a substantial heat capacity and large changes in the temperature of the material at the adapter section 16 cannot be made quickly. Consequently, the cascade temperature controls systems just described are used in the zone feedback concept to provide control of the melt temperature over normal operating ranges.

The required changes in set point temperature of the controllers for the different sections or zones of the extruder barrel varies from section to section. For example, near the input end, in zone or section 20, there would typically be very little change of the set point, and this zone would not vary greatly in heat requirements when the screw changes in speed. Greater change would be needed in section 21 and in section 22, with the change in the set point for section 22 typically being twice that for section 21.

With the prior art cascade control system, changes in temperature of the product occasioned by changes in screw speed, result in melt temperature changes. The thermal recovery time of the melt control system is a function of the melt temperature response due to screw speed change and heater capacity at the barrel zones and typically requires 5 to 20 minutes for full recovery. This means that a considerable amount of plastic material coming out of the die 17 will be of a different temperature during this recovery period and therefore of different properties from that which was desired.

In order to correct for this melt temperature sensing delay after the screw speed change, the present invention comprises the addition of a tachometer generator 15 driven by the motor 14, which delivers an electrical signal proportional to the motor speed along line 44. This signal is fed into a squaring circuit 45 wherein the output signal along line 46 is proportional to the motor speed squared. The squaring circuit can be of design commonly available in the art. This squared signal then is added into the computer 34, which includes a summing circuit to sum the conditioned signal responsive to sensor 18, and the squared signal from line 46. The summed signals are passed through manual attenuators 41A, 42A and 43A along the lines 41, 42 and 43 to change the set point temperatures of the controllers 30, 31 and 32 if necessary. The manual attenuator provide adjustment to give different adjustments to each barrel zone. The set point of controller 30 does not usually have to be changed as much as that of controller 32, for example.

The thermal energy added to the molten plastic by the screw is substantially proportional to the square of the screw speed, thus in the preferred embodiment the circuit 45 performs a squaring function on the tachometer generator signal. Because the tachometer generator signal changes as soon as the motor speed changes, the proper signal proportional to the thermal change is immediately available at the computer 34 to be summed with the signal on line 39 and can immediately adjust the set points of the controllers 30, 31 and 32 to compensate for the heat that is being put into the plastic material as soon as the screw speed increases, or for the heat which is no longer being added if the screw speed decreases. Thus the controllers can immediately compensate for this heat input change, thus eliminating the lag which otherwise occurs and the change does not have to be carried all the way to the sensor 18 before an adjustment is made. This control provides extremely tight control of the temperature of the melt in adapter section 16 throughout a wide range of screw speeds and in fact is very effective for speeds all the way from the purge speed up to full operational speeds.

In a typical installation the output signal on line 39 from controller 33 to computer 34 is $E_T = K_1 T + K_2 \int (dT/dt)$, where $E_T$ is a voltage signal, $T$ is temperature and $t$ is time. The letters $K_1$ and $K_2$ designate constants. Then designating $E_s$ as voltage proportional to screw speed and $E_c$ the voltage for modifying the set point of controller 30, the voltage on line 43 is $$E_c = K_5 [K_1 T + K_2 \int (dT/dt) + (K_3 E_s^2 + K_4)] .$$

$K_3$, $K_4$ and $K_5$ are additional constants. Similar expressions exist for the voltage on lines 42 and 41. However the constants would normally be different.

The addition of the control dependent upon screw speed has resulted in a system which typically reduces the time of recovery to less than half of that existing without such control. This is the time resulting in temperature changes due to a change in screw speed. Typically a 10 percent in change in screw speed with the above system results in a temperature upset of only about 5° F and full recovery is obtained in approximately 3 to 8 minutes. The time constant or time required to change from purge operation to full speed operation is approximately 15 minutes on a 4½ inch diameter screw machine with the above system. The operation under so called "steady state" where speed changes are those normally due to loading and normal motor speed variations has been improved with the above system so that the melt temperature in the melt region of adapter 16 is held to approximately =1° F over continued operation.

The compensation circuitry is normally utilized with thermoplastic extruders, but can be used in connection with extruders using other materials as previously mentioned.

In food processes the material is not actually molten when extruded but is in a plastic state and the temperature just ahead of the die is very important.

What is claimed is:

1. A control system for forming machinery for plastic materials wherein the forming machinery includes a working element for plastic materials, power means for driving said working element, and wherein the speed of movement of said working element driven by the power means affects the temperature of the materials, the improvement comprising means providing a substantially continuous signal which is a function of the speed of said working element, control means on said machinery including means providing a signal representing a set point temperature, said control means being operative to maintain temperature within a selected range in at least one portion of said machinery and including means responsive to differentials in temperature of said portion and said set point temperature, and means responsive to said substantially continuous signal which is a function of said speed of movement of said working element to change the signal representing the set point temperature as a function of change of speed of movement of the working element.

2. An extruder assembly comprising a barrel and an extruder screw rotatably mounted in said barrel, power means for rotating said screw, means on at least one portion of said barrel for regulating the heat in said barrel, means to sense the heat in said portion, a controller means having a set point against which the sensed temperature in that portion of the barrel is compared, said controller further controlling heating or cooling to regulate the temperature in response to the signal from the sensor in respect to the set point, means to sense the temperature of material in a preselected location on said extruder assembly and to provide a first signal proportional thereto, means providing a second signal which varies as a function of the speed of said screw, and control means summing the first and second signals to provide a third signal to adjust the set point of said controller in a preselected manner.

3. The combination of claim 2 wherein the second signal is substantially proportional to the square of the screw speed.

4. The combination as specified in claim 3 wherein there are a plurality of zones in said barrel separately regulated for heat control, and a plurality of controllers, one for each zone in said barrel, said control means having means to provide a separate third signal to each controller for said barrel zones.

5. The combination as specified in claim 3 wherein said means providing said second signal comprises a tachometer generator responsive to the speed of rotation of said screw delivering an electrical signal, and circuit means to receive the electrical signal from said tachometer generator and to deliver an electrical signal proportional to the square of the speed of said screw to said control means.

6. The control system of claim 1 and temperature sensing means to sense temperature of plastic material in a second portion of said forming machinery and to provide a second temperature signal, said means responsive to the substantially continuous signal including means to combine the substantially continuous signal and said second temperature signal to change the signal representing the set point temperature as a function of the combined substantially continuous and second temperature signals.

7. The control system of claim 6 wherein said working element is a rotating element, said means providing said substantially continuous signal including means providing said substantially continuous signal as a function of the square of the rotational speed of said rotating element.

* * * * *